H. H. NIEMEYER, A. E. LEHMANN & A. SINSKEY.
SLEEPING CAR.
APPLICATION FILED OCT. 13, 1906.
964,539.
Patented July 19, 1910.
5 SHEETS—SHEET 2.
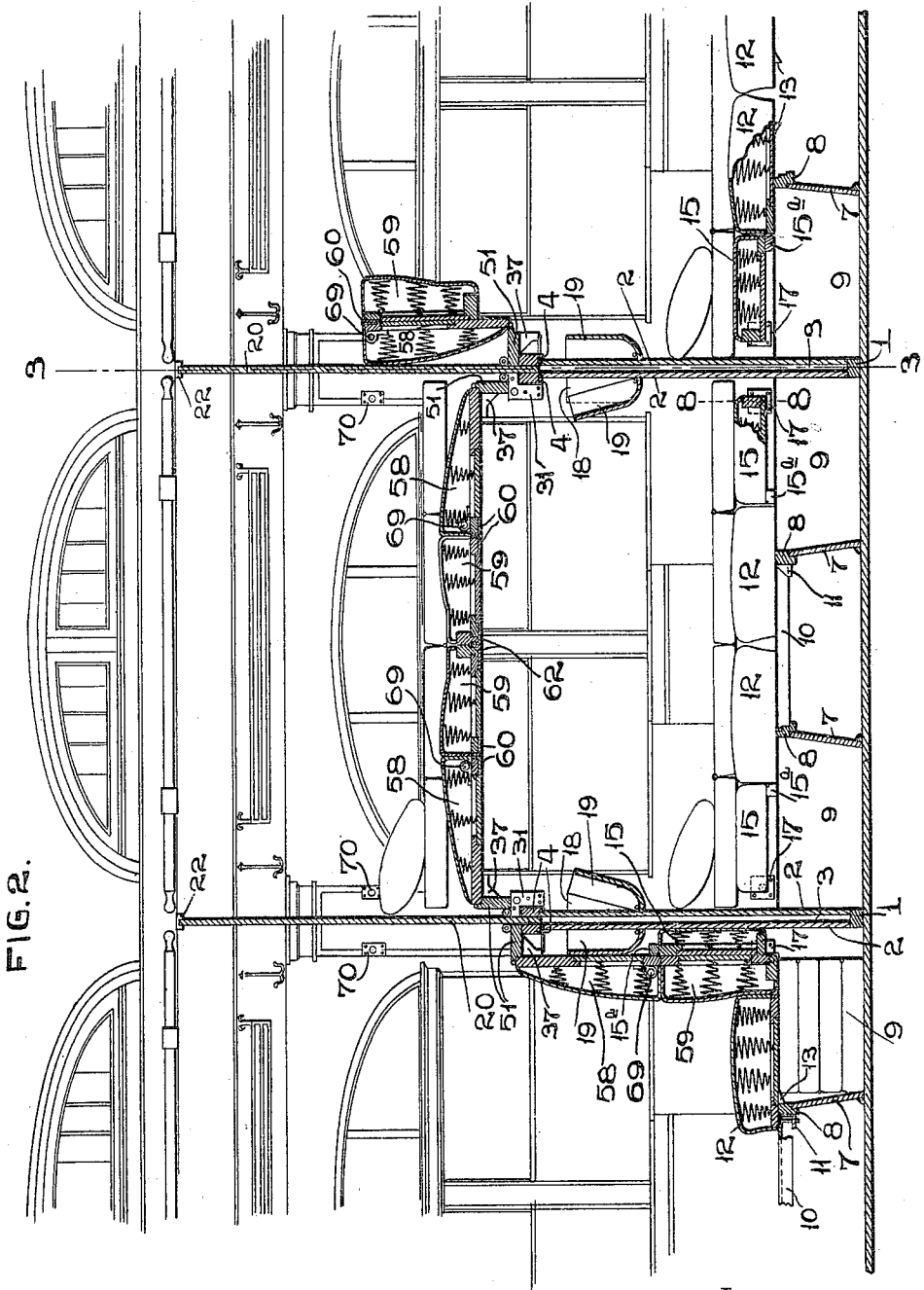
ATTEST.
H. J. Fletcher.
M. T. Smith
INVENTORS.
H. H. NIEMEYER.
A. E. LEHMANN.
A. SINSKEY.
BY Higdon & Longan
ATTYS H. H. NIEMEYER, A. E. LEHMANN & A. SINSKEY.
SLEEPING CAR.
APPLICATION FILED OCT. 13, 1906.
964,539.
Patented July 19, 1910.
5 SHEETS—SHEET 3.
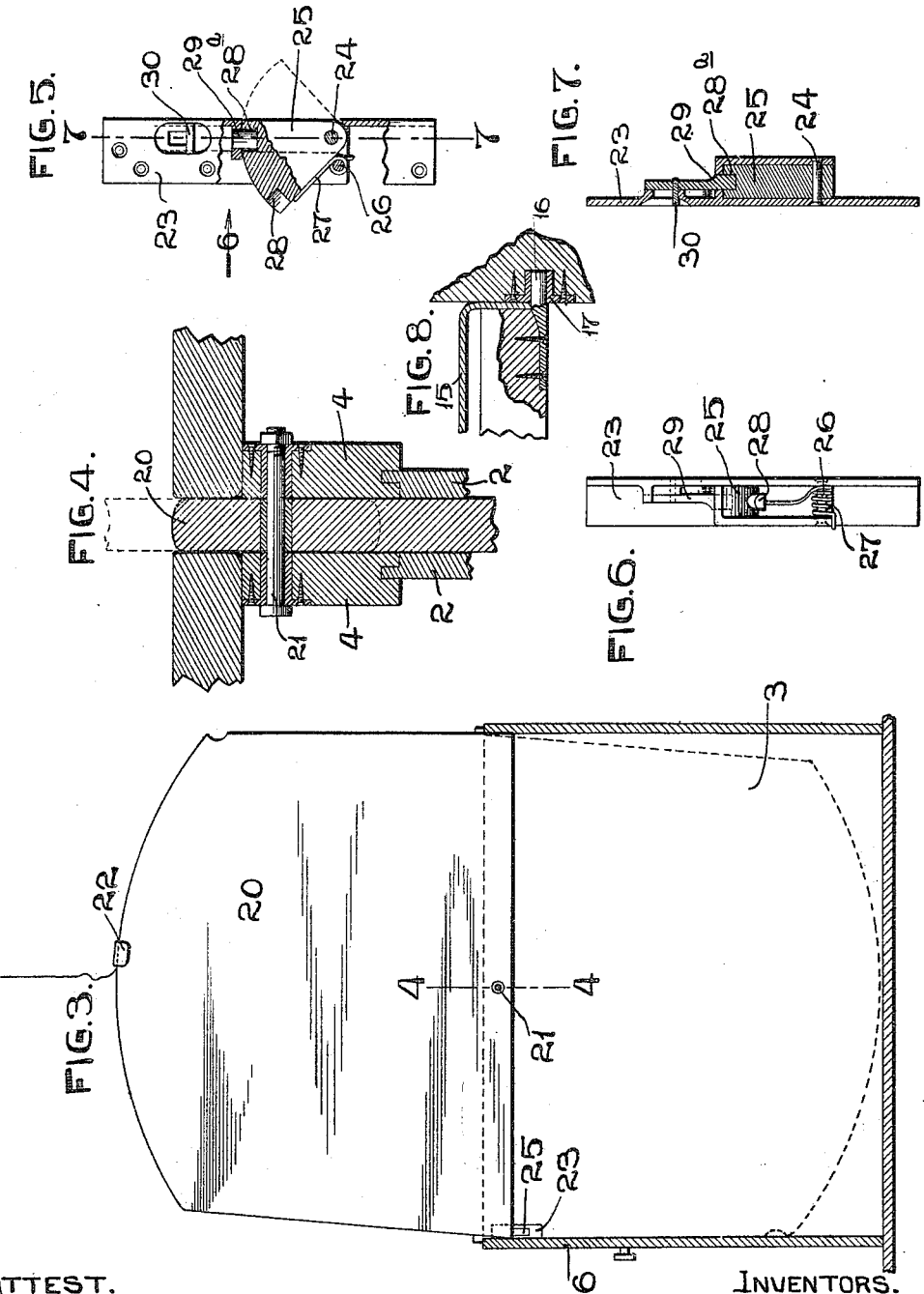
ATTEST.
H. J. Fletcher
W. P. Smith
INVENTORS.
H. H. NIEMEYER.
A. E. LEHMANN.
A. SINSKEY.
BY Higdon & Longan
ATTY'S.

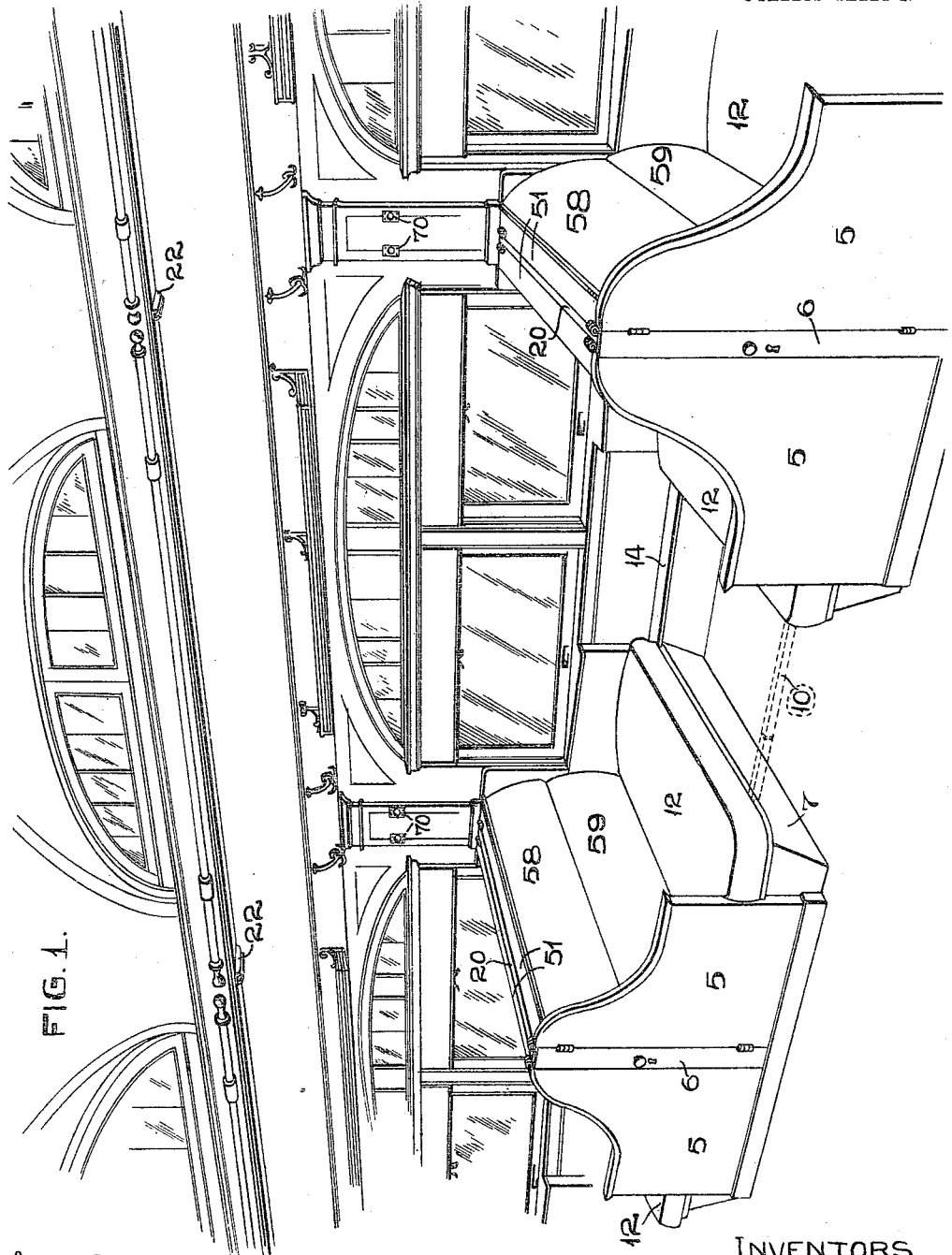

H. H. NIEMEYER, A. E. LEHMANN & A. SINSKEY.
SLEEPING CAR.
APPLICATION FILED OCT. 13, 1906.
964,539.
Patented July 19, 1910.
5 SHEETS—SHEET 4.
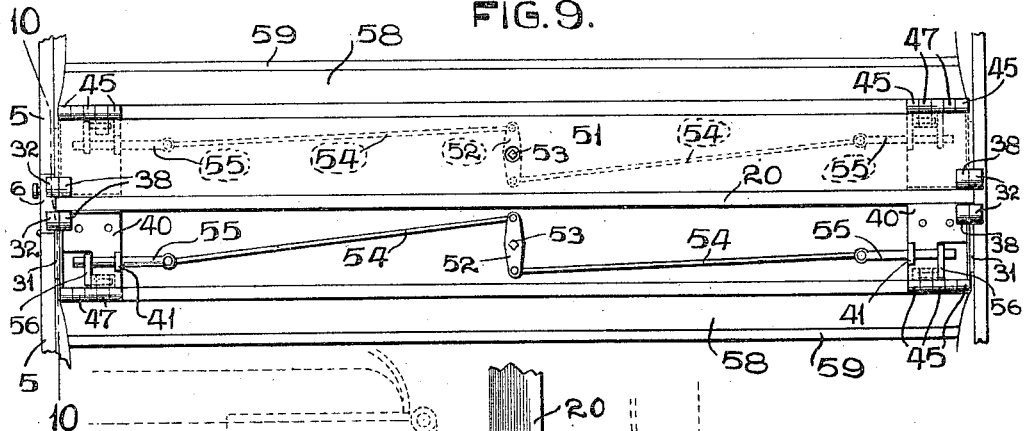
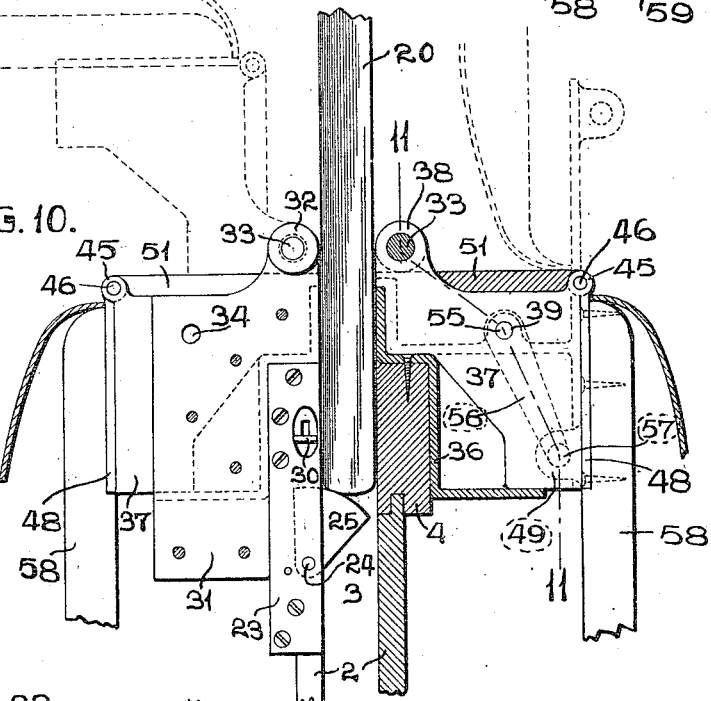
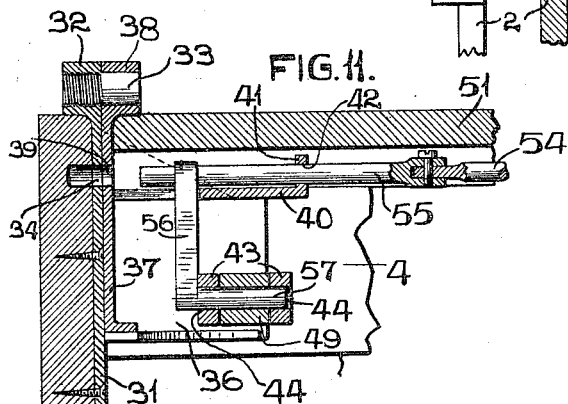
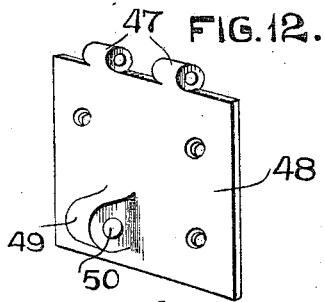
INVENTORS.
H. H. NIEMEYER.
A. E. LEHMANN.
A. SINSKEY.

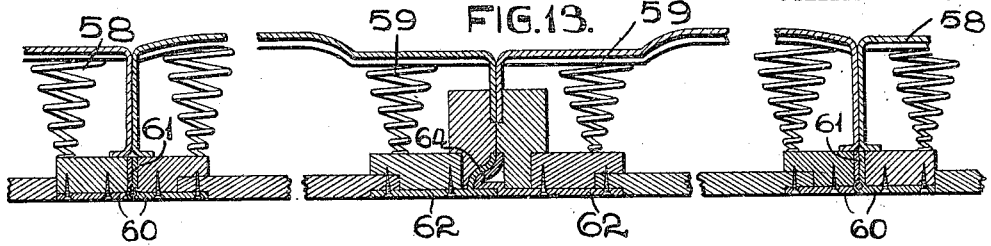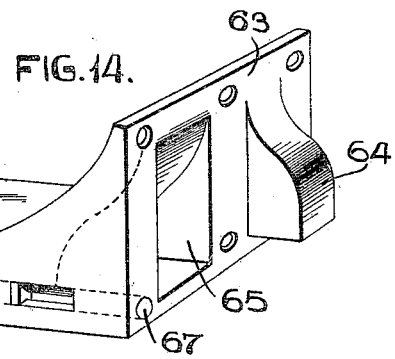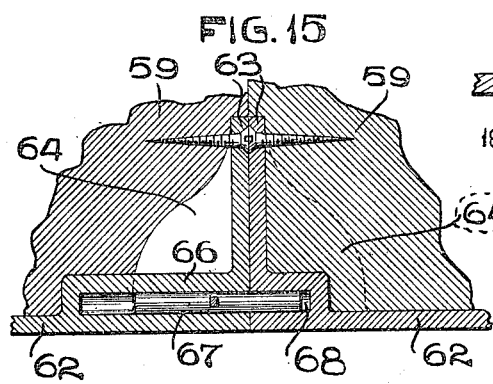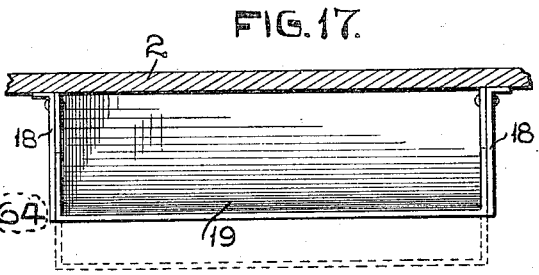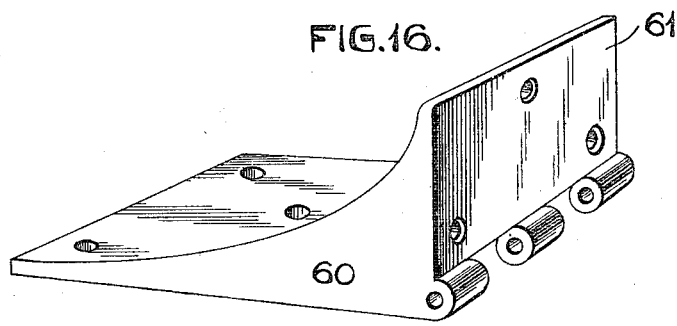

UNITED STATES PATENT OFFICE.

HERMAN H. NIEMEYER, ARTHUR E. LEHMANN, AND ADOLF SINSKEY, OF ST. CHARLES, MISSOURI.

SLEEPING-CAR.

964,539.  Specification of Letters Patent.  Patented July 19, 1910.

Application filed October 13, 1906. Serial No. 338,878.

*To all whom it may concern:*

Be it known that we, HERMAN H. NIEMEYER, ARTHUR E. LEHMANN, and ADOLF SINSKEY, all citizens of the United States, and residents of St. Charles, Missouri, have invented certain new and useful Improvements in Sleeping-Cars, of which the following is a specification, containing a full, clear, and exact description, reference being had to the accompanying drawings, forming a part hereof.

Our invention relates generally to sleeping cars, and more particularly to an improved arrangement and construction of the berths in sleeping cars, and the particular objects of our invention are to provide an improved construction whereby more room is obtained on the interior of the car than is the case in sleeping cars of the present construction, and to provide for the making up of a lower berth without having to make up or open the upper berth, thus lessening the work of making up the berths and adding to the convenience and comfort of the occupant of the lower berth.

A further object of our invention is to utilize the space between the seat backs as a compartment for a head board which may be swung upwardly to form a partition between the upper berths, and to utilize the space behind a portion of each seat back as a compartment for one of the sections which forms a part of the lower berth.

To the above purposes, our invention consists in certain novel features of construction and arrangement of parts, which will be hereinafter more fully set forth, pointed out in the claims, and illustrated in the accompanying drawings, in which:—

Figure 1 is a perspective view of a portion of the interior of our improved sleeping car, and showing the parts in the position they assume when the berths are not made up; Fig. 2 is a vertical section taken longitudinally through the center of one of the compartments, and showing the berths made up; Fig. 3 is a vertical section taken on the line 3—3 of Fig. 2; Fig. 4 is an enlarged detail section taken approximately on the line 4—4 of Fig. 3; Fig. 5 is a front elevation with parts in section of a locking member for holding the head board in its elevated position; Fig. 6 is an elevation of the locking member seen in Fig. 5, and looking in the direction indicated by the arrow 6; Fig. 7 is a vertical section taken on the line 7—7 of Fig. 5; Fig. 8 is an enlarged detail section taken approximately on the line 8—8 of Fig. 2; Fig. 9 is a plan view of the frame work between the seats of our improved car, with one of the hinged cover boards removed; Fig. 10 is a section taken approximately on the line 10—10 of Fig. 9; Fig. 11 is a vertical section taken approximately on the line 11—11 of Fig. 10; Fig. 12 is a perspective view of a hinge plate located on the seat backs, and used in connection with the hinges shown in Figs. 10 and 11; Fig. 13 is a vertical section taken longitudinally through the upper berth, with parts thereof broken away; Fig. 14 is a perspective view of one of a pair of interlocking plates which are made use of between the central members of the upper berth; Fig. 15 is a detail section taken vertically through the outside pair of interlocking plates, and showing a locking bolt positioned therein; Fig. 16 is a view of one of the hinge members made use of between the central and outer members of the upper berth; Fig. 17 is a plan view of a pocket which is positioned against the frame work between the compartments.

In our improved construction, the body of the car is of ordinary well known construction, and the compartments are located on each side of a central aisle, and the seats in each compartment being arranged adjacent the windows in the sides of the car, and positioned so as to face one another.

Located on the car floor at suitable distances apart are the transversely arranged timbers 1, and positioned thereon and extending upwardly a suitable distance is a pair of panels 2, between which is formed a space 3, and arranged on the tops of these panels are the rails 4. Fixed in any suitable manner to the inner ends of each of the panels 2 are the seat ends 5, which are in alinement with the sides of the aisle through the car, and the space between said seats is normally closed by a narrow hinged door 6. Extending from the front of the seat ends to the side walls of the car are panels 7, on top of which are mounted the rails 8, this arrangement forming compartments 9 between the seat ends 5 and the side of the car, which compartments receive the mattresses, pillows, and other bedding used in connection with the berths. Hinged in any suitable manner to the front edge of one of the rails 8 in each compartment, and adjacent the inner end thereof, is an angle bar 10, which is adapted to swing horizontally so as to bridge the space between the inner ends of the car seats, and when so positioned, its free end normally rests on a lug 11 which is fixed to the opposite rail 8, this arrangement forming a support for the inner ends of the seat cushions when the same are moved forwardly to form the central portion of the lower berth. (See Fig. 2.) Cushioned seats 12 are normally positioned immediately over the compartments 9, and are held against forward movement by lugs 13 which engage behind the rails 8, and said seats are intended to be moved forwardly over the rails 8, and rest on the angle bar 10 and a ledge 14 formed in the side wall of the car when the lower berth is made up. Cushioned sections 15 are arranged immediately over the rear portions of the compartments 9 against the panels 2, and are hinged to the seat ends 5 and to the side walls of the car at their rear lower corners by means of pins 16 entering sockets 17. These sections are swung upwardly into vertical positions against the panels 2 when the seats are in use, and, when the lower berth is made up, said sections are swung downwardly over the compartments 9, and thus form the outer pair of sections which form the bottom of the lower berth. Hinged to the front lower corner of each section 15 is a spacing rail 15$^a$ which swings into position beneath the front edge of said section when the same is lowered into position over the compartment 9, and when the section is swung into a vertical position, this rail is positioned on the front edge of said section. Fixed to each panel 2 just below the rails 4 is a pair of outwardly projecting plates 18, to the lower ends of which are hinged the lower end walls of a pocket 19 which normally lies against the corresponding panel 2, and which is adapted to receive bedding used in connection with the berths and the curtains which close the front of the berths.

20 designates a head board which, when elevated as shown in Figs. 2 and 3, forms a partition extending from the panels 2 upwardly to the top of the car, and thus completes the compartment above the lower berth, and which is occupied by the upper berth. These head boards are pivotally arranged upon a transverse pin 21 which passes through the centers of the rails 4, and said head board is swung inwardly toward the aisle when the door 6 is open, and said panel is then swung upwardly so that one end engages against the side wall of the car, and a part of its top engaging against a portion of the car ceiling; and, when so positioned, said upper edge is engaged and held by an inverted U-shaped bracket 22 secured to the car ceiling. Arranged between the upper inner corners of the panels 4 is a lock which is intended to engage the inner lower corner of the head board 20 to maintain the same in its elevated position when swung upwardly to form the compartments for the berths. This lock comprises an angle plate 23 which is secured to the forward edge of one of the panels 4 by means of screws, or in any suitable manner, and pivotally mounted on the rear of said plate by means of a pin 24 is a segmental block 25, which operates through a corresponding opening formed in one of the wings of said plate; and arranged on a pin 26 to the rear of said block is a spring 27, which normally bears against the rear side of said block and tends to force the same outwardly. Formed in the top of the block is a pair of recesses 28 and 28$^a$, in which is adapted to engage a pin 29, operated by means of a thumb piece 30, and which pin maintains the block 25 in either an open or closed position, corresponding to its engagement in the recesses 28 and 28$^a$. When said pin 29 is engaged in the recess 28$^a$, the block 25 is held in an unlocked position against the pressure of the spring 27, and the head board 20 is free to be elevated or lowered, and when the pin 29 is withdrawn from the recess 28$^a$, the spring 27 will spring the block 25 outwardly, as shown in Fig. 10, in position to engage beneath the lower edge of the head board 20; and said block can be locked in this position by engaging the pin 29 in the recess 28.

Fixed in any suitable manner to the inner face and upper end of each seat end 5 and to the side wall of the car directly opposite the upper end of each seat end are the hinge plates 31; and formed integral with the upper rear corners thereof are lugs 32 in which are seated horizontally disposed pins 33. Formed through the upper portions of these plates 31 are apertures 34, and corresponding apertures formed in the seat ends 5 and the wood work of the side of the car immediately to the rear of said apertures 34. Formed integral with the inner face of each plate 31 is an inwardly projecting web 36, which overlies and is fixed to the rail 4. The opposite member of each hinge comprises a plate 37 which is provided on its upper rear corner with a perforated lug 38, which is pivotally mounted on the pin 33, and formed in said plate is an aperture 39 which corresponds with the aperture 34. Formed integrally with the inner face of each plate 37 is an inwardly projecting web 40, and integral with the outer end thereof is a vertically arranged lug 41, which is provided with a horizontal perforation 42. Integral with the lower end of each web 40 is a pair of lugs 43 which are provided with the alined horizontally arranged perforations 44. Integral with the upper outer corners of each of the plates 37 is a series of perforated ears 45, through which passes a hinge pin 46, and hinged upon said pin 46 are the perforated ears 47 of a plate 48, which is provided on its inner face with a lug 49, which normally occupies a position between the pair of lugs 43, and which lug 49 is provided with a horizontally arranged aperture 50. Fixed in any suitable manner to the upper end of each corresponding pair of plates 37 are the horizontally disposed panels 51, which normally form the tops of the seat backs, and between which the head boards operate. Arranged to swing on the under side of the center of each panel 51 is a lever 52, the center of which is provided with a lug 53 to be engaged by a key, or similar manipulating device, and pivotally connected to the ends of this lever are the inner ends of a pair of oppositely projecting rods 54. Loosely connected to the outer end of each rod 54 is a locking bolt 55, which operates through the aperture 42 in the lug 41, and the outer end of which locking bolt is in direct alinement with the coinciding apertures 34 and 39. Integral with each locking bolt 55 is a depending arm 56, and integral with the lower end thereof is a horizontally disposed pin 57 which normally occupies the coinciding perforations 44 and 50 in the lugs 43 and 49. Rigidly fixed in any suitable manner to each corresponding pair of plates 48 is the upper rear side of the frame of one of the end sections 58 which normally forms the upper half of the seat back and which, when swung upwardly, forms one of the outer ends of the upper berth.

59 designates upholstered sections which normally form the lower halves of the seat backs and which, when swung upwardly, form the middle sections of the upper berth; and said sections are connected at their outer lower corners to the outer lower corners of the sections 58 by means of plates 60 which are hinged together at their lower corners; and said plates being provided with vertically disposed webs 61 which bear against one another when the upper berth is made up. Fixed to the outer lower corners of the frames of the sections 59 are horizontal plates 62, with the outer ends of which are formed the vertically disposed webs 63, which webs coincide with one another when the sections are swung together in making up the upper berth. Formed integral with each plate 63 is an outwardly projecting lug 64 having a horizontal lower end, and formed immediately adjacent this lug in each plate is a recess 65 corresponding in shape to the lug 64, and which receives the lug on the opposite plate, thus making said plates interlocking, and preventing the downward movement of the sections 59 past a horizontal plane. Formed in one of the plates 62 of the set which is adjacent the aisle is a housing 66, in which operates a horizontally arranged locking bolt 67, the forward end of which is adapted to enter a corresponding recess 68 formed in the opposite plate, thus providing means for rigidly uniting the plates 62 against vertical movement. Arranged in the end of each section 58, adjacent the side wall of the car, is an ordinary sliding bolt 69, which may be moved horizontally outward to engage in a corresponding perforated plate 70 located in the side wall of the car, and so positioned as to receive the locking bolt when the sections 58 and 59 are swung into vertical positions, (as shown at the right hand in Fig. 2,) and when the lower berth only is made up.

When a car of our improved construction is in use as a day coach, with the berths not made up, the sections 15 are swung upwardly against the panels 2 behind the sections 59, and the sections 12 are positioned over the compartments 9, which latter contain the mattresses and bedding used in connection with the berths. To make up the berths in one of the sections, the doors 6 at the ends of the section to be made up are opened, after which the head boards 20 are swung outwardly and upwardly until their upper edges engage the brackets 22, and the lower forward corners thereof are engaged by the blocks 25, which are moved outwardly by the springs 27 when the pins 29 are withdrawn from the recesses $28^a$, and after said blocks are swung outwardly beneath the head boards, said pins 29 are engaged in the recesses 28 to lock said blocks. The angle bar 10 is now swung around into a transverse position so as to bridge the space between the rails 8 adjacent the car aisle, and the free end of said angle bar is engaged in the corresponding lug 11. The sections 12 are now moved toward one another until their front edges meet, which front edges have previously been slightly elevated to allow the lugs 13 to pass over the rails 8. The mattresses and bedding to be used in making up the berths are now removed from the compartments 9, after which the sections 58 and 59 are swung outwardly to a sufficient degree to allow the sections 15 to swing downwardly into horizontal planes over the compartments 9 behind the sections 12, thus forming the frame work or body of the lower berth, and upon which one of the folding mattresses and other necessary bedding is positioned. When the sections 15 are lowered, the spacing rails $15^a$ engage on top of the side walls of the compartment 9, and thus hold said sections 15 in proper horizontal alinement with the sections 12, the ends of which rest on the ledge 14 and angle bar 10. To make up the upper berth, the operator swings the sections 58 upwardly, and in so doing shifts the panels 51 from horizontal into vertical positions, during which movement the plates 37 hinge on the pins 33, and the plates 48, to which the frames of the sections 58 are secured, move with the plates 37 for the reason that the pins 44 are positioned in the coinciding apertures 44 and 50. This arrangement of the hinges and the shifting of the panels 51 from horizontal into vertical positions elevates the upper berth to the desired point, and thus provides the proper space above the lower berth when made up. When the sections 58 are swung upwardly, they are moved a slight degree past a horizontal line, and at the same time the sections 59 are swung upwardly to their limit of movement, and when this point is reached, said sections 59 are so manipulated as to cause the lugs 64 on the plates 63 to enter the corresponding recesses 65 in the opposite plates, thus interlocking the meeting edges of the sections 59, after which all of the sections 58 and 59 are allowed to move downwardly into a horizontal plane, after which the locking bolt 67 is engaged in the recess 68 to firmly lock the parts together against any vertical movement. Thus, the frame work of the upper berth is arranged, and the support therefor being the frame work of the seat backs; and after said berth frame work has been provided, the mattress and bedding is positioned thereon. The curtain rod which is positioned above each compartment is now brought forward until it occupies a position at the front of the compartment and the curtains are positioned thereon, thus completing the making up of the berths in the compartment.

Suitable racks and hooks are provided against the side wall of the car in the upper portion of each compartment, which may be utilized for clothing and packages, and the pockets 19, when swung forwardly, form a convenient receptacle for clothing and the like.

When it is desired to utilize the lower berth only and to swing the frame work of the upper berth into an out-of-the-way position, the operator after making up said lower berth shifts the levers 52 by means of a suitable key engaging the lug 53, and moves the rods 54 outwardly, and by so doing moves the locking pins 55 outwardly until their outer ends pass through the coinciding apertures 34 and 39, thus locking the plates 31 and 37 together. This movement withdraws the locking pins 57 from the perforated lugs 49, and the sections 58 are now free to be swung upwardly into vertical positions without moving the panels 51, during which upward swing the plates 48 swing upon the hinge pins 46. After these sections 58 have been so elevated, the sections 59 are locked in position by engaging the bolt 69 in the corresponding plates 70, and after which the sections 59 are swung downwardly against the under sides of the sections 58. Thus, the occupant of the lower berth obtains the convenience of the entire space within the compartment.

A particular advantage of a sleeping car of our improved construction is that the entire weight of all the upper berths in the car is borne by the seat backs, which rest upon the floor of the car, thereby keeping the weight near the base of the car body, which arrangement causes the car to ride much easier and with less swing or lateral vibration than where the weight of the upper berths is suspended from the top of the car, which latter arrangement tends to make the car top heavy.

Sleeping cars of our improved construction are very convenient, inasmuch as the arrangement of the upper berths provides for an increased space on the interior of each compartment as compared to sleeping cars of the present construction, and all of the berths are easily and quickly made up or taken down.

If desired, the head boards at the ends of the compartment may be elevated, and the curtains put up in front of said compartment without making up the berths, thus providing a private compartment during the time the car is made up as a day coach.

We claim:—

1. In a sleeping car, the combination with a seat frame, of a panel pivotally connected to the seat frame back in such a manner as to be swung outwardly and upwardly to form a partition between the top portion of said back and the car ceiling.

2. In a sleeping car, a seat frame, in the back of which is formed a pocket, a panel pivotally connected to the seat back in such a manner as to occupy the pocket and to be swung outwardly and upwardly to form a partition between the top portion of said back and the car ceiling, and means whereby said panel is locked in its elevated position.

3. A sleeping car, constructed with a seat frame, there being a space between the backs of said seats, and a panel pivotally mounted adjacent its top edge to the said frame in the space and adapted to swing upwardly against the side and ceiling of the car; substantially as specified.

4. A sleeping car, constructed with a series of seat frames, seat back sections hinged to the top portions of the seat frames in such a manner as that when said sections are swung into horizontal positions to form the base of the upper berth they occupy a plane higher than the tops of the seat frames, and interlocking means arranged on the meeting faces of the seat back sections, which interlocking means engage one another when said sections are swung into a horizontal position.

5. A sleeping car, constructed with a series of seat frames, seat back sections hinged to the upper portions of the seat frames in such a manner as that when said sections are swung into horizontal positions they occupy a plane higher than the tops of the seat frame backs, and panels pivotally connected to the backs of the seat frames and adapted to be swung outwardly and upwardly to form partitions above said frames.

6. A sleeping car, constructed with a series of back to back seat frames, frames hinged to the upper ends of an adjacent pair of seat frames and adapted to be swung upwardly into a horizontal plane to form a berth, and panels normally positioned in said frames and arranged to swing upwardly to form partitions above said frames; substantially as specified.

7. A sleeping car, constructed with a series of back to back seat frames, frames hinged to the upper ends of an adjacent pair of seat frames and adapted to be swung upwardly into a horizontal plane to form a berth, panels normally positioned in said frames and arranged to swing upwardly to form partitions above said frames, and movable sections carried by the seat frames for forming a berth beneath the first mentioned berth; substantially as specified.

8. A sleeping car, constructed with a series of compartments, seat frames arranged on opposite sides of each compartment, and a rail hinged at one end to the front of one of the seat frames and adapted to swing in a horizontal plane so that its free end engages upon the opposite seat frame.

9. A sleeping car, constructed with a series of compartments, seat frames arranged on opposite sides of each compartment, a rail hinged at one end to the front of one of the seat frames and adapted to swing in a horizontal plane so that its free end engages upon the opposite seat frame, and a lug fixed on the front edge of the opposite frame to receive the free end of the rail.

10. A sleeping car, constructed with a series of compartments, seat frames arranged on the opposite sides of each compartment, a rail hinged to one seat frame and adapted to swing forwardly and rest upon the opposite seat frame, movable seat sections arranged on the seat frames and adapted to rest on the hinged rail when the same is swung into position between the seat frames, and panels normally positioned behind the seat frames and adapted to swing upwardly to form partitions extending from the seat frames to the top of the car; substantially as specified.

11. A sleeping car, constructed with a series of back to back seat frames, members connected to the upper ends of said seat frames and arranged to be elevated thereon, seat back members connected to said sections and arranged to be swung upwardly into a horizontal plane to form the base of a berth, and interlocking means arranged on the meeting faces of the seat back sections, which interlocking means automatically engage with one another when the seat back sections are swung into a horizontal plane.

12. A sleeping car, constructed with a series of back to back seat frames, members connected to the upper ends of said seat frames and arranged to be elevated thereon, seat back sections connected to said members and arranged to be swung upwardly into a horizontal plane to form the base of a berth, and interlocking plates arranged on the meeting faces of said back members, which plates automatically engage one another when said sections occupy a horizontal plane.

13. A sleeping car, constructed with a series of seat frames, movable sections arranged on said seat frames for forming the base of the lower berth, sections which normally form the seat backs, and which sections are swung upwardly into a horizontal plane to form the upper berth, a connection between said sections and the tops of the seat backs whereby said sections are moved into a plane above the tops of the seat backs when horizontally arranged, interlocking plates fixed on the meeting faces of the movable sections whereby said sections are locked together when swung into a horizontal plane, and panels arranged between the backs of the seat frames and adapted to be swung upwardly to form partitions between said seat frames and the top of the car; substantially as specified.

14. A sleeping car, constructed with a series of seat frames, panels, hinges connecting the panels to the seat frames, seat back sections, hinges connecting said seat back sections to said panels, which seat back sections are adapted to swing upwardly into a horizontal plane to form the base of a berth and means for interlocking the hinge members connecting the seat back sections with the panels.

15. A sleeping car, constructed with a series of back to back seat frames, panels hinged to the upper ends of said seat frames, sections hinged to said panels, which sections are adapted to swing upwardly into a horizontal plane to form the base of a berth, and means whereby the hinges for the panels and the hinges for the upwardly swinging sections are locked together; substantially as specified.

16. A sleeping car, constructed with a series of back to back seat frames, panels hinged to the upper ends of said seat frames, sections hinged to said panels, which sections are adapted to swing upwardly into a horizontal plane to form the base of a berth, means whereby the hinges for the panels and the hinges for the upwardly swinging sections are locked together, and means whereby the meeting edges of the movable sections are locked together when said sections occupy a horizontal plane; substantially as specified.

17. A sleeping car, constructed with a series of seat frames, seat back sections hinged to the top portions of the seat frames and adapted to be swung into horizontal positions to form the base of the upper berth, interlocking plates arranged on the meeting faces of the seat back sections, and independent locking means arranged on one of the seat back sections for engaging the opposite seat back section to positively lock the same together when in horizontal positions.

18. A sleeping car, constructed with a series of seat frames, seat back sections hinged to the top portions of the seat frames and adapted to be swung into horizontal positions to form the base of the upper berth, interlocking plates arranged on the meeting faces of the seat back sections, and a bolt carried by one of the seat back sections and adapted to engage in a recess in the adjacent seat back section to positively lock said sections to one another when in horizontal positions.

19. A sleeping car, constructed with a series of seat frames, seat back sections hinged to the upper portions of the seat frames and adapted to swing in a horizontal plane to form the base of the upper berth, plates fixed to the seat frames beneath the seat back sections and projecting outward from the seat frames, and pockets hinged at their lower ends between each corresponding pair of plates.

20. A sleeping car, constructed with a series of seat frames, seat back sections adapted to be moved in contact with each other to form the base of the upper berth, means carried by the seat back sections and pivotally connected to the upper portion of the seat frames for supporting the seat back sections when moved in a position to form the base of the upper berth in a plane substantially higher than the points of pivotal connection between said seat back sections and seat frames, which means in themselves prevent said seat back sections, when elevated to form the base of the upper berth, from spreading apart, and mean carried by the seat back sections for locking the meeting ends of a pair of the seat back sections together.

21. In a sleeping car, a pair of seat frames oppositely arranged, seats on the seat frames and which seats are movable in contact with each other in order to form a portion of the base of the lower berth, seat back sections capable of being moved in a position to form the base of the upper berth, means carried by the seat back sections and pivotally secured to the upper portion of the seat frames for supporting the seat back sections when moved in a position to form the base of the upper berth above the tops of the seat frames, which means in themselves prevent said seat back sections, when elevated to form the base of the upper berth, from spreading apart, and means whereby the meeting edges of the seat back sections are rigidly connected when elevated.

22. In a sleeping car, a pair of seat frames, oppositely arranged seats on the seat frames and which seats are movable in order to form a portion of the base of the lower berth, seat back sections hinged to the seat frames in such a manner as to be swung into a horizontal plane to form the base of the upper berth, means whereby the meeting edges of the seat back sections are rigidly connected when elevated, and panels pivotally connected to the seat frames and adapted to be swung upward to form partitions above the seat frames.

23. A sleeping car, constructed with a series of seat frames, seat back sections capable of being moved in contact with each other to form the base of the upper berth, means carried by the seat back sections and pivotally connected to the upper portion of the seat frames for supporting and projecting the seat back sections when moved in a position to form the base of the upper berth in a plane substantially higher than the points of pivotal connection between the seat back sections and seat frames, which means in themselves prevent said seat back sections, when elevated to form the base of the upper berth, from spreading apart, thus producing the proper elevation for the upper berth and forming a truss structure between the points of pivotal connection of the seat back sections and seat frames, and the contacting margin of the seat back sections.

In testimony whereof, we have signed our names to this specification, in presence of two subscribing witnesses.

HERMAN H. NIEMEYER.
ARTHUR E. LEHMANN.
ADOLF SINSKEY.

Witnesses:
M. P. SMITH,
E. L. WALLACE.